US010181310B2

(12) United States Patent
Lim et al.

(10) Patent No.: US 10,181,310 B2
(45) Date of Patent: Jan. 15, 2019

(54) METHOD FOR SYNCING MOUSE REPORT RATE AND SCREEN REFRESH RATE

(71) Applicant: PixArt Imaging (Penang) SDN. BHD., Penang (MY)

(72) Inventors: Kevin Len-Li Lim, Penang (MY); Willie Song, Penang (MY)

(73) Assignee: PixArt Imaging (Penang) SDN. BHD., Penang (MY)

( * ) Notice: Subject to any disclaimer, the term of this patent is extended or adjusted under 35 U.S.C. 154(b) by 66 days.

(21) Appl. No.: 15/369,892

(22) Filed: Dec. 6, 2016

(65) Prior Publication Data

US 2018/0158436 A1    Jun. 7, 2018

(51) Int. Cl.
*G09G 5/12*   (2006.01)
*G06F 3/0354*   (2013.01)
*G06F 3/038*   (2013.01)
*G09G 5/36*   (2006.01)

(52) U.S. Cl.
CPC ............... *G09G 5/12* (2013.01); *G06F 3/038* (2013.01); *G06F 3/03543* (2013.01); *G09G 5/363* (2013.01)

(58) Field of Classification Search
CPC ................................... G09G 5/12; G06F 3/03
See application file for complete search history.

(56) References Cited

U.S. PATENT DOCUMENTS

2003/0151588 A1*   8/2003   Rensberger ............. G06F 3/038
345/156

* cited by examiner

*Primary Examiner* — Sepehr Azari
(74) *Attorney, Agent, or Firm* — Winston Hsu

(57) ABSTRACT

A method for synchronizing a mouse report rate with a screen refresh rate of a computer includes: utilizing the computer to inform the mouse of a time period of each screen refresh; and adjusting the mouse report rate in accordance with the time period so that an equal integer number of frames will be reported in each screen refresh. Another method includes: determining a screen refresh rate of the computer; setting a target number of frames to be reported to the computer in each screen refresh period; scaling a motion report count of the mouse to generate a post-processed motion report count which corresponds to the target number of frames; and utilizing the post-processed motion report count to add or subtract frames to the number of frames reported during the mouse report period.

3 Claims, 2 Drawing Sheets

METHOD FOR SYNCING MOUSE REPORT RATE AND SCREEN REFRESH RATE

BACKGROUND OF THE INVENTION

1. Field of the Invention

This invention relates to a computer mouse and a display, and more particularly, to a method and apparatus which can sync a screen refresh rate of the display with a report rate of the mouse.

2. Description of the Prior Art

In a standard computer system, a mouse is a commonly used device for controlling a graphical user interface such as a display screen. Two-dimensional motion of the mouse relative to a surface is translated into a delta of movement (dx, dy) and reported to an operating system (OS) of the computer at regular intervals; this is known as the mouse report rate. The computer uses this information to move a pointer on the display in response to the reported motion of the mouse.

The display screen will also be updated at regular intervals: this is known as the screen refresh rate. At the beginning of each refresh period, the display will be updated using all data received in the previous refresh period. Assuming the mouse is moved by a user at a fairly steady speed, one would expect the movement of the pointer on the display screen to also be steady. As the refresh rate of the display screen and the report rate of the mouse are not in sync, however, it may occur that the mouse reports fewer frames in one particular refresh period of the display screen than in another refresh period. This will result in a 'jerky' or jumping appearance of the pointer on the display.

Refer to FIG. 1A, which illustrates a desired mouse pointer movement on a display screen in response to steady movement of the mouse, and FIG. 1B, which illustrates mouse pointer movement on a display screen when the mouse report rate is not synced to the display refresh rate. As shown in FIG. 1A, when the mouse is moved at a steady rate/constant speed, this should be reflected by equal incremental updates in the position of the pointer on the display. AS shown in FIG. 1B, however, small gaps will exist in the updated pointer positions, due to the lack of sync between the mouse report rate and the screen refresh rate. Although these gaps are small, the human eye is very sensitive to such changes. Inconsistencies in the perceived pointer motion on the display may cause discomfort to a user, or even make her feel that there are some problems with the computer system.

SUMMARY OF THE INVENTION

It is therefore an objective of the present invention to provide a mouse and computer system which results in smooth movement of the mouse pointer on the display screen.

This is achieved by syncing a mouse report rate with the screen refresh rate.

This is further achieved by a method according to a first embodiment of the present invention. The method comprises: utilizing the computer to inform the mouse of a frequency and a corresponding time period of each screen refresh; and adjusting the mouse report rate in accordance with the time period so that an equal integer number of frames will be reported in each screen refresh. For an initial screen refresh, a report rate is determined according to the smallest adjustment which can achieve a reported integer number of frames in the initial screen refresh period, and this integer number of frames is set as the integer number of frames for subsequent screen refresh periods.

A method according to a second embodiment of the present invention comprises: scaling a motion report count of the mouse to generate a post-processed motion report count which is synced with the screen refresh rate. In a first modification, the computer informs the mouse of the screen refresh rate, and the mouse sets a target number of frames to be reported to the computer in each screen refresh period. For each screen refresh period, a motion report count of the mouse is scaled to generate a post-processed motion report count which corresponds to the target number of reported frames, and the post-processed motion report count is utilized to add or subtract frames to the number of frames reported during the mouse report period. The resultant number of frames is then reported to the computer. In a second modification, the mouse sends a number of frames per screen refresh to the computer, the computer sets a target number of frames according to the screen refresh rate, and scales the motion report count of the mouse to generate a post-processed motion report count which corresponds to the target number of frames.

For an initial screen refresh period, the post-processed motion report count is generated by: multiplying a motion report count for the initial screen refresh period with the target number of frames; and dividing the product by the number of frames reported in this initial screen refresh period to generate the post-processed motion report count. The post-processed motion report count is subtracted from the motion report count to generate a remainder count, and the target number of frames is subtracted from the number of frames reported to generate a remainder number of frames. In subsequent screen refresh periods, the step of scaling the motion report count of the mouse comprises: adding the motion report count of a current screen refresh period to a remainder count of a screen refresh period immediately prior to the current screen refresh period; multiplying the result by the target number of frames to generate a first figure; and dividing the first figure by the sum of the number of frames reported in the current screen refresh period and the remainder frames of the screen refresh period immediately prior to the current screen refresh period to generate the post-processed motion report count.

These and other objectives of the present invention will no doubt become obvious to those of ordinary skill in the art after reading the following detailed description of the preferred embodiment that is illustrated in the various figures and drawings.

DETAILED DESCRIPTION

The present invention provides methods for syncing a mouse report rate with a screen refresh rate. The aim is to achieve synchronicity between the two such that a smooth pointer movement is seen on the display screen when the mouse is moved at a steady rate.

Assuming a computer monitor operates at a frequency of 125 Hz, and a mouse sensor operates at 12,000 frames per second (fps), one would expect that a same number of frames are reported to the computer monitor in each screen refresh period, resulting in steady updated movement of the pointer on the display screen. As the screen refresh rate is not synced to the mouse report rate, however, the number of frames which are reported to the computer monitor will not be constant for each screen refresh period, even when the mouse is moving at a constant speed. For example, the screen refresh occurs in the middle of a frame report of the mouse, so the final frame is not reported. It is an aim of the present invention to sync the mouse report rate to the screen refresh rate, so that steady movement of the mouse is reflected on the display as steady movement of the pointer.

Figure 1A:
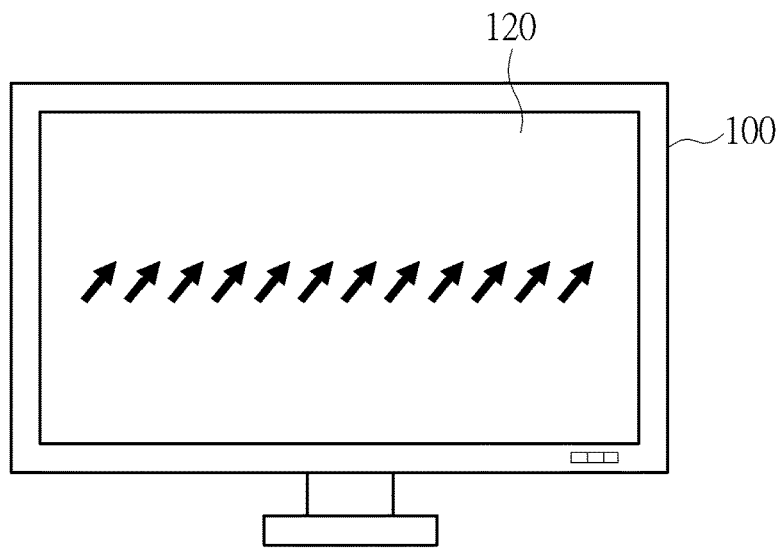
FIG. 1A is a diagram illustrating desired mouse pointer movement on a display screen.
Figure 1B:
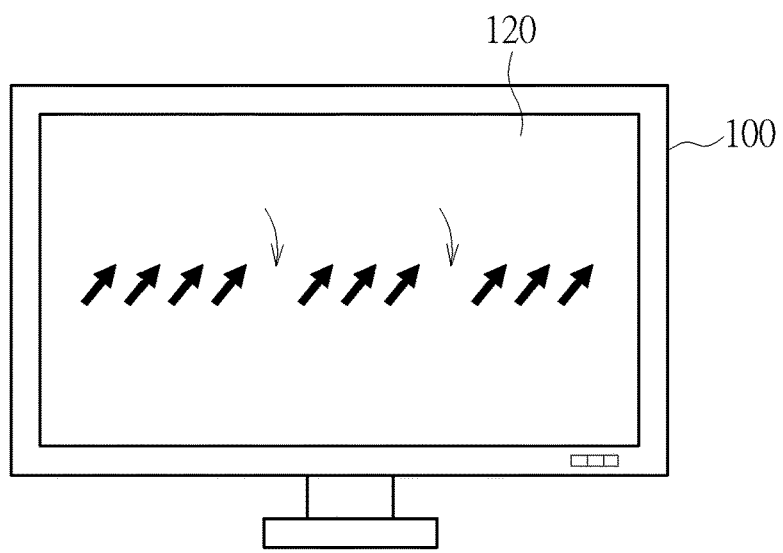
FIG. 1B is a diagram illustrating mouse pointer movement on a display screen when the mouse report rate is not synced to the display refresh rate.
Figure 2:
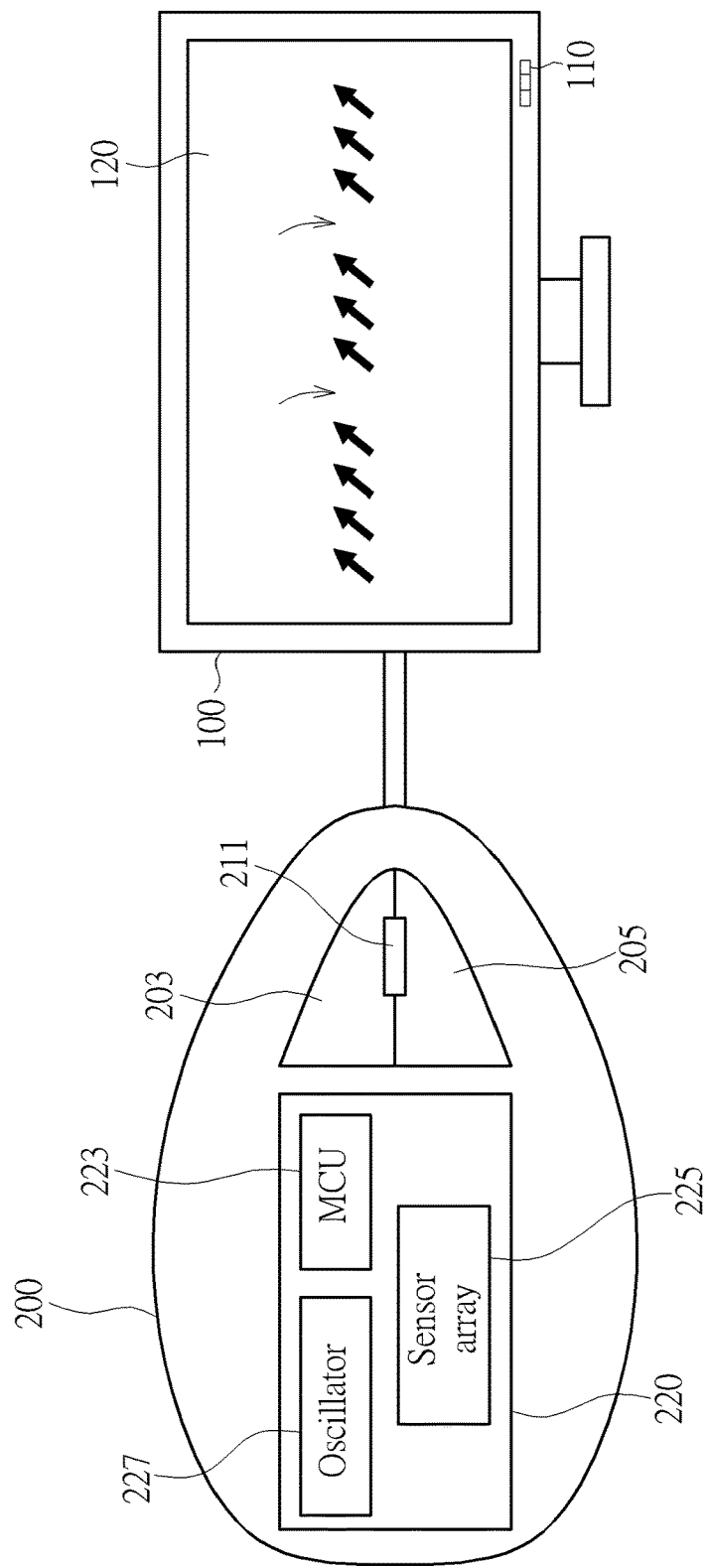
FIG. 2 is a diagram of a mouse and computer monitor according to an exemplary embodiment of the present invention.

Both hardware and software-based methods are proposed. Refer to FIG. 2, which is an illustration of a mouse 200 and computer monitor 100. The computer monitor 100 includes control buttons 110 and a display screen 120. As shown in the diagram, the mouse 200 contains a scrolling wheel 211, a right click button 205 and a left click button 203, and a USB micro-controller unit (MCU) chip 220, which comprises an MCU 223, a sensor array 225 and an oscillator 227. The scrolling wheel 211 and click buttons 203, 205 send information to the sensor array 225 of the USB MCU chip 220, which translates the received input into signals which are sent to the computer monitor 100. The oscillator 227 in the USB MCU chip 220 is for determining the frame rate by setting a frequency. The following hardware and software-based methods can be applied to the mouse 200 and computer monitor 100 shown in FIG. 2.

A first method according to an embodiment of the present invention will be detailed herein. In this method, communication between the computer monitor 100 and mouse 200 is enabled, so the computer operating system (OS) (not shown) can inform the mouse sensor array 225 of the screen refresh rate of the display 120. The mouse sensor array 225 can then tune its frame rate to be in sync with the screen refresh rate.

Table 1 shows tuned frame rates according to various monitor refresh rates. The monitor refresh rate is converted into a time per screen refresh, and this information is sent to the mouse. Using this information, the mouse frame rate can be adjusted so that an integer number of frames will be reported during one screen refresh period. A target number of frames to be reported can therefore be set, and used for a next screen refresh period.

TABLE 1

| Monitor refresh | Time per refresh | Mouse frame rate | Number frames per monitor refresh |
|---|---|---|---|
| 60 | 0.01667 | 14400 | 240 |
| 85 | 0.01176 | 14450 | 170 |
| 100 | 0.01000 | 14000 | 140 |
| 120 | 0.00833 | 14400 | 120 |
| 144 | 0.00694 | 14400 | 100 |

Taking a monitor refresh frequency of 120 Hz as an example, this frequency translates to a time per screen refresh of 0.00833 seconds (8.33 milliseconds). By setting the mouse frame rate to a frequency of 14400 fps, a total of 120 frames can be reported in this time period. Setting the mouse report rate at this particular frequency ensures that an integer number of frames will be reported in each screen refresh period, and therefore the number of frames reported for each screen refresh period can be kept a constant value, translating to steady updated movement of the mouse pointer on the display screen 120.

It will be obvious to one skilled in the art that in order to adjust the frame rate to reach the target number of frames, the frequency of the oscillator 225 needs to be flexibly increased or decreased; i.e. the oscillator 225 requires trimming ability. This is a standard feature in gaming mice, and therefore implementing the method according to the first embodiment does not require any additional circuitry. Further, when setting the frame rate for a first screen refresh period, the initial frequency adjustment is determined by the mouse sensor array 225, which calculates the least amount of adjustment in order to achieve an integer number of frames to be reported in the screen refresh period.

A second embodiment of the present invention uses a software-based solution to sync the mouse report rate and screen refresh rate. In this embodiment, communication is from the mouse 200 to the computer monitor 100. Rather than adjusting a frame rate in accordance with each screen refresh period, a target number of frames are set by the mouse 200 or the computer. A difference is determined, and a number of frames in a current screen refresh period and a number of frames in an immediately previous screen refresh period are used to scale a motion report count. In this way, a constant post-processed report count can be achieved.

Table 2 shows the various parameters used to set the target number of frames per refresh.

TABLE 2

| Monitor refresh rate | 60 | Hz |
|---|---|---|
| Monitor refresh period | 16.66667 | msec |
| Mouse speed | 1 | IPS |
| Mouse resolution | 3000 | DPI |
| Mouse frame rate | 1000 | Hz |
| Target number of frames per refresh (TGTF) | 16 | — |

As detailed in the background section, a number of frames reported by the mouse 200 for each screen refresh will not be constant even when the mouse is moved at a steady speed. The system therefore sets a target number of frames for each screen refresh to be 16. Note that this target number of frames can be set by the mouse 200 or by the computer. In order to reach the target number of frames, the actual motion report count (RPTM) needs to be scaled. This scaling can also be performed by the mouse 200 or by the computer.

The following parameters are used to scale the motion report:
Target number of frames per refresh (TGTF)
Number of frames per monitor refresh (NF)
Motion report count (RPTP)
Post-processed report count (RPTP)
Remainder count (RMDRC)
Remainder frames (RMDRF)

The Remainder count is determined by the following equation:

$$RMDRC[IDX]=RPTM[IDX]-RPTP[IDX] \quad (1)$$

wherein [IDX] refers to a current motion report of the mouse.

The Remainder frames are determined by the following equation:

$$RMDRF[IDX]=NF[IDX]-TGTF \quad (2)$$

From the above equations, a post-processed report count (RPTP) can be determined by the following equation:

$$RPTP[IDX] = HRPTM[IDX] + RMDRC[IDX-1])$$
$$*TGTF)/(NF[IDX] + RMDRF[IDX-1]) \qquad (3)$$

This is illustrated in Table 3.

TABLE 3

| IDX | 1 | 2 | 3 | 4 | 5 |
|---|---|---|---|---|---|
| NF | 16 | 16 | 17 | 15 | 16 |
| RPTM | 0 | 48 | 51 | 45 | 48 |
| RPTP | 0 | 48 | 48 | 48 | 48 |
| RMDRC | 0 | 0 | 3 | −3 | 0 |
| RMDRF | 0 | 0 | 1 | −1 | 0 |

Looking at IDX period 3 as an example, in this particular screen refresh period, the number of frames reported is 17, i.e. one above the target. The post-processed motion count therefore needs to be scaled down so that an equal number of frames will be reported for this IDX as for the previous IDX. Putting the numbers into equation (3):

$$(51+0)*16/17+0=51*16/17=816/17=48$$

Looking at IDX period 4, in this particular screen refresh period, the number of frames reported is 15, i.e. one below the target. The post-processed motion count therefore needs to be scaled up so that an equal number of frames will be reported for this IDX as for the previous IDX. Putting the numbers into equation (3):

$$(45+3)*16/15+1=48*16/16=48$$

In this way, the mouse 200 or computer can scale the motion report count of the mouse 200 such that the post-processed motion report count is an equal amount for each screen refresh period.

The essential idea of the present invention is to make the mouse report rate equal to a multiple of the screen refresh rate. By directly adjusting a frame rate of the mouse 200, or scaling a motion report of the mouse 200, a constant and integer number of frames can be reported to the computer 100 during each screen refresh of the computer display 120. This constant number of reported frames will be reflected on the display 120 as steady incremental movement of a pointer on the display, resulting in a more comfortable experience for a user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for synchronizing a mouse report rate with a screen refresh rate of a computer, the method comprising:
   utilizing the computer to inform the mouse of the screen refresh rate, a frequency and a corresponding time period of each screen refresh; and
   adjusting the mouse report rate in accordance with the screen refresh rate and the time period so that an integer number of frames will be reported in a specific screen refresh, comprising:
      determining a report rate of the mouse which will report an integer number of frames in the time period of the screen refresh; and
      adjusting the frequency of an oscillator of the mouse to reach the determined report rate.

2. The method of claim 1, wherein the mouse report rate is adjusted so that an equal integer number of frames will be reported in each screen refresh.

3. The method of claim 1, wherein the step of determining a report rate of the mouse which will report an integer number of frames in the time period of the screen refresh comprises:
   for an initial screen refresh, determining a report rate according to the smallest adjustment which can achieve a reported integer number of frames in the initial screen refresh period; and
   setting that integer number of frames as the integer number of frames for subsequent screen refresh periods.

* * * * *